Sept. 5, 1967 W. WILD 3,339,415
DEVICE FOR PROTECTION FROM AND DETECTION OF LEAKS IN
PIPELINES CONVEYING LIQUIDS OR GASES
Filed April 16, 1964 2 Sheets-Sheet 2

INVENTOR
WERNER WILD 3,339,415
DEVICE FOR PROTECTION FROM AND DETECTION OF LEAKS IN PIPELINES CONVEYING LIQUIDS OR GASES
Werner Wild, Zurich, Switzerland, assignor to Elektro-Watt Elektrische und Industrielle Unternehmungen A.G., Zurich, Switzerland
Filed Apr. 16, 1964, Ser. No. 360,300
Claims priority, application Switzerland, Apr. 19, 1963, 4,995/63
10 Claims. (Cl. 73—40.5)

ABSTRACT OF THE DISCLOSURE

A pipe to carry fluid under pressure is provided with a lining of thin material spaced slightly from the inner surface of the pipe. The space between the pipe and the lining is filled with fluid which is connected to pressure responsive alarm means so that when the pressure in the interspace deviates from its normal pressure an alarm will sound, or some control means is actuated.

The device comprises an ordinary pipe of sufficient strength to convey the desired fluid at the desired pressure. The diameter will be as large as required for the flow planned for the pipe. Within this pipe is a thin-walled sleeve or lining that is sealed to the pipe at each end of the pipe with a welded or soldered joint having the minimum axial length required to provide a satisfactory seal. Seals other than welded or soldered could, of course, be used as the seal structure per se is not a part of this invention. The sleeve or lining is almost as large in outer diameter as the pipe is in inner diameter. There is a fluid completely filling the space between the pipe and the lining and an aperture is provided in the pipe connected to the space between the pipe and lining and on which is mounted pressure responsive means.

Quite a number of devices and methods for determining and locating leakages in pipelines and in tanks have become known. These consist for example in wrapping the pipeline with plastic foils, in order to collect leaking fluids, and conveying them along the pipe into a collecting pit, where the liquid is detected by an electrical contact probe, effected owing to a change of level or a change of length of a swelling material, like silicon rubber for example, which dilates under the influence of hydrocarbons.

Other applicances comprise such electrical contact probes arranged at small distances directly between the plastic foil and the pipeline, an electrical contact likewise being established, with mineral oils for example, by dissolving an adhesive compound, and this contact being transmitted over a cable, to a control station.

Devices are also known in which, with the aid of a comparatively thick-wall profiled plastic skin on the outside of the pipe, a cavity is provided by the profile between the pipe wall and the skin, and is evacuated by a vacuum pump. If oil leaks into this evacuated space, the vacuum collapses, which again can likewise be signalled to a remote station. The same is the case in the event of a crack in the plastic skin.

So-called alarm cables with oil-soluble insulation have been experimentally inserted, which, upon the insulation dissolving, should produce a short circuit at the position in question. Since the insulation in question tended to become plastic under the external soil pressure, it led to short circuits and false alarms.

Other devices consist in the measurement of quantities of fluid flowing through, or of speed of flow effected over longer or shorter distances, for instance by injecting radioactively marked substances into the conveying medium at accurately determined intervals of time and determining their passage times between different measure points.

Further possibilities provide for introducing, into the interior of the pipe, a thinner pipe, and filling the intervening space with water, which is brought up to the necessary counter-pressure with a pump, for the purpose of "supporting" the thin-walled pipe when the pipe line is in operation. If a leak occurs in the inner thin-walled pipe, or in the outer actual pipe line, the pump delivers water, which serves as a criterion for the formation of a leak.

A further protective measure against leakage consists in placing two pipes concentrically one in the other, the interspace being set for instance with air at a low pressure. If the inner pipe line, carrying oil for example, becomes leaky, a rise of pressure occurs in the interspace; if the outer pipe becomes leaky, the pressure in the interspace falls, so that by remote signalling of this safety pressure the state of the two pipes at any time can be supervised.

All these devices have important disadvantages. Thus a plastic foil, wrapped around the pipe line as a duct for discharging accidentally leaking oil to a collecting shaft or to the next oil probe, reduces almost to zero the action of the cathodic corrosion protection which is indispensible in pipeline installations, so this device may actually induce corrosion on the pipeline, and therefore bring about the leak-formation, against which it should have been a protection. It also provides no guarantee that the leaking substance will be reliably conveyed into the collecting pit in question, or to the appropriate warning probe, but rather that the foil, upon the formation of a leak, will prematurely burst, with the result that the leaking substance escapes into the ground, even before the leakage warning is effected.

The adoption of vacuum and profiled plastic skins depends essentially upon the reliable functioning of the vacuum pump. Then again the plastic skin likewise reduces the action of the cathodic corrosion protection, and may accordingly give rise to corrosion. The determination of leakage with the aid of the measurement of quantities flowing through or of speed of flow is unreliable, and is unsuitable for small leakage losses. Moreover with these an accurate locating of the position of a leak is impossible.

The use of a thinner tube in the interior of the actual pipeline, with supporting of the same by means of a pump and water, brings with it, in the case of variable delivery pressure, great difficulties in the technology of control, and depends entirely upon the reliability of the operation of the pump; and a sufficiently large interspace between the outer and inner pipes has to be ensured, in order that in the event of a leak occurring, while maintaining the pressure conditions, water can be delivered by the pump to the position of the leak without too great a loss of pressure. It is therefore necessary, on account of the scraping which is indispensable in crude oil pipelines for example, to select the outer pipe of larger diameter at this place.

The last-mentioned leakage-protection device, of two pipes located concentrically one in the other, is doubtless more reliable in operation, but involves very great expense, and, under topographically unfavourable conditions, with many pipe bends, cannot be adopted at all.

All the devices enumerated above and hitherto known for giving warning of leaks or affording protection against leaks either reduce the safety of the pipe line, or depend entirely upon the reliability of some other element, such as a pump, which in itself is secondary. Moreover by continuously consuming energy they occasion additional expense, or involve other technical difficulties either in control or in construction. It is common to almost all of them, however, that they only respond to a leak when the leakage substance is already escaping from the pipeline, and possibly even already soaking into the ground.

The aforementioned disadvantages and risks of known devices for protecting from and/or detecting leakages in pipelines are obviated by the method and the associated means according to this invention, which enables the formation of a leak to be detected, localised and repaired even before fluids have escaped into the ground, and which does not impair the cathodic corrosion protection. It also has the important advantage that it can be completely manufactured and adjusted in the pipe manufacturers plant, ready for operation, which is not possible with any of the devices hitherto known. The cost of a pipeline provided with the apparatus according to the invention, and installed ready for use, is only about 20 to 30 percent higher than that of an ordinary pipeline alone, and need hardly be taken into consideration at all, since the number of pipe lengths provided with the device is always relatively small in relation to the entire length of the pipeline.

One of the preferred forms of construction of the invention is hereinafter described and is illustrated in its essential details in the accompanying drawings, in which.

Figure 1:
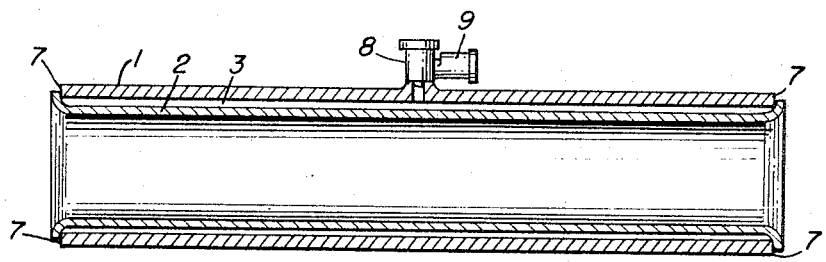
FIGURE 1 shows a semi-diamgrammatic section through a normal manufacturing length of piping, equipped with the leakage-protecting and detecting device according to this invention.
Figure 2A:
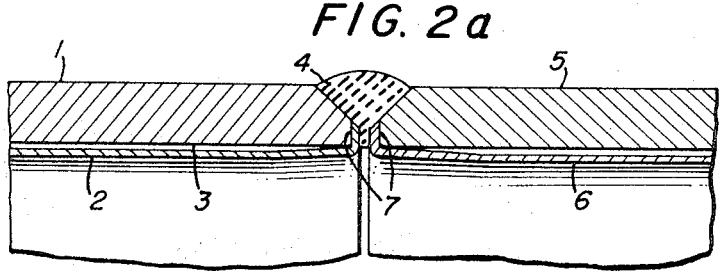
FIGURE 2 shows two detail views of a usual pipe joint, the lining pipe being flanged over and welded endwise according to FIGURE 2a, and being cut off flush and welded to the inner periphery at the end of each of the two pipes according to FIGURE 2b.

In FIGURE 1, a pipe 1 of normal manufacturing length is shown provided in the interior with a thin-walled lining pipe 2, the ends of which are joined at 7 in a fluidtight manner to the ends of pipe 1. The lining pipe 2 preferably consists of steel, of a composition as similar as possible to that of the pipe 1, with a wall thickness of from 0.5 to 1.0 mm., and with an internal diameter smaller by about 5 percent than that of the pipe 1. The ends of this steel pipe 2 are widened in manufacture, possibly flanged over, and by preference electrically resistance-welded at 7 as shown in FIGURE 2. As soon as one end face has been welded, the interspace 3 is either filled with a heat resistant oil (for instance silicone oil), or left empty. The other end face is then welded. The pipe is hereupon subjected to the usual hydraulic pressure test. The thin-walled lining pipe 2 is hereby expanded, consolidated, and thereby rendered more resilient. After shutting off the test pressure, the pipe 2 contracts resiliently, by about 0.5 mm. for instance in the case of a pipe of medium diameter of about 500 mm., so that in a pressureless condition there is an interspace having a volume of about 0.8 litre per metre length between the pipes 1 and 2.

Figure 2B:
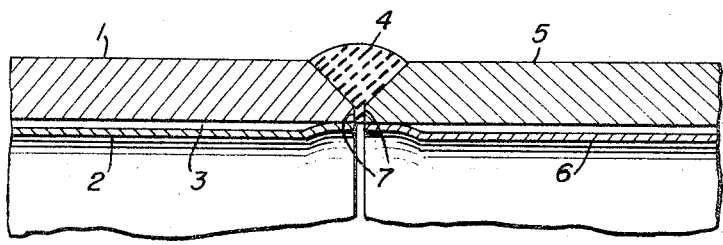

FIGURE 2 shows the end-face welded joint, in the form of the usual V-seam, of two pipes 1 and 5, with their lining pipes 2 and 6. From the illustration it is clear that the assembly welding of the pipes provided with the leak-protecting device according to the invention can be effected entirely by the conventional technique. Instead of the flanging over and the end-face welding, however, the lining pipes 2 and 6 may be merely cut off plane and flush with the end faces of the pipes 1 and 5 respectively, and electrically resistance-welded along the ends by a circular weld 7 of a breadth of from 2 to 3 mm., as illustrated in FIGURE 2b.

Figure 3:
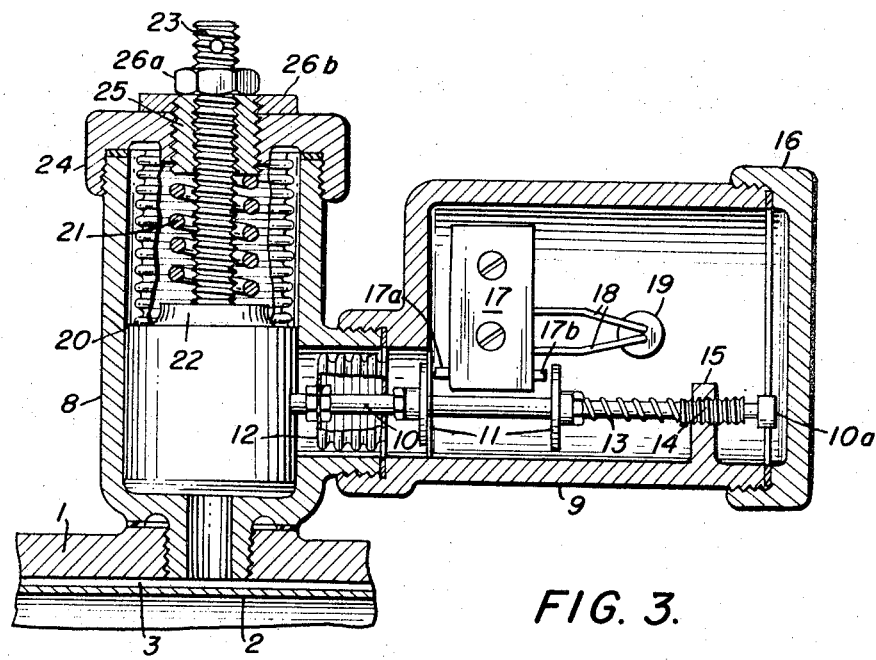
FIGURE 3 shows a leakage probe in a preferred construction, in longitudinal section.

In the middle of the pipe 1, in an appropriate tapped hole, with a sealing seat, a leakage probe 8, 9 (FIGURE 1) is mounted, and the satisfactory sealing of this probe from the pipe 1 is vacuum-tested. This leakage probe as shown in FIGURE 3 consists of a pressure capsule 8 and a control capsule 9, which is in pneumatic or hydraulic communication with the pressure capsule 8 by way of a spring bellows 12, according to whether the space 3 is filled with a liquid, such as silicone oil, or with a gas for instance air or nitrogen. The pressure capsule 8 contains a spring bellows 20, which is subject to the pressure of an auxiliary spring 21, and can be arrested in a selected end position with the aid of a positioning bolt 23 and a stiffening plate 22. So far as is necessary by providing a second abutment, the stroke of the spring bellows 20 might likewise be limited in a downward direction, but this apparently may be dispensed with in consideration of the adjustability of the spring 21 by means of the hollow screw 25. The positioning bolt 23, and also the hollow screw 25, can be blocked by means of lock nuts 26a and 26b. Instead of the spring bellows 20 and 12, appropriately shaped diaphragms of metal or synthetic material might be employed. The pressure capsule 8 is sealed to the cover 24 in a fluidtight manner by means of a packing disc.

The control capsule 9 of the probe contains a control rod 10, which is connected with the spring bellows 12 and provided with a screw thread, and upon which two abutment plates 11 are mounted, which can be arrested by means of lock nuts on the thread of the control rod 10. The control rod 10 is axially displaceable, and is loosely guided at one end in the spring bellows 12 and at the other end in a hollow screw 14. The hollow screw 14 can be screwed to and fro in the rib 15. It serves for adjusting the pressure of the spring 13, and at the same time for varying the stroke of the control rod 10 by way of the abutment head 10a and the cover 16 of the control capsule. Between the abutment plates 11 is mounted a micro-switch 17, the trip cams 17a and 17b of which can be actuated by the abutment plates 11. Through a gastight connector socket 19 are passed double-wire electric connecting cables 18 leading from the micro-switch 17, so that the impulses thereof can be transmitted, by way of a four-wire cable for example, to a remote station.

Figure 4:
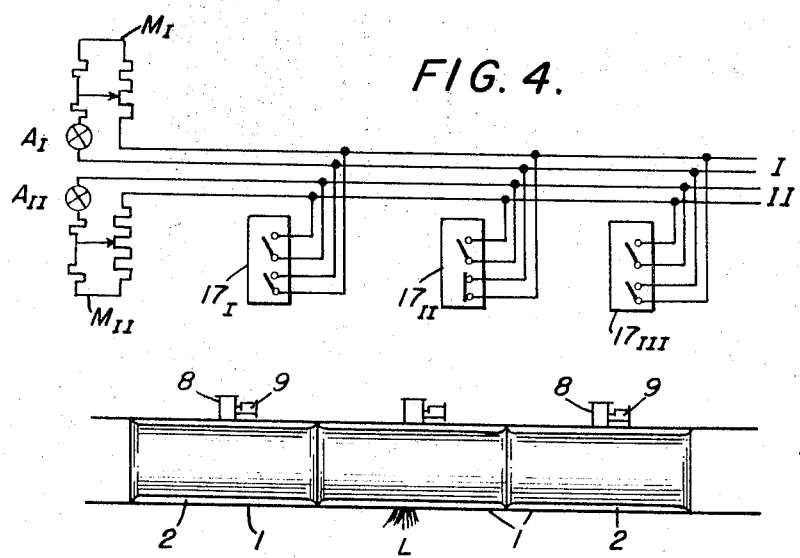
FIGURE 4 is a diagrammatic view of a pipeline protected according to the invention against leakage-formation, with the associated electrical circuit diagram.

The four-wire cable is represented in FIGURE 4 with the circuits I and II. With the two wires of the cable pertaining to the circuits I and II are connected the associated switch poles of the trip cams 17a and 17b of the microswitches $17_I$, $17_{II}$ and $17_{III}$ allocated to each leakage probe 8, 9. Underneath these switches in FIGURE 4 is diagrammatically drawn a leakage-protection stretch of pipeline according to the invention. Each two wires of the four-wire cable are connected, in a remote station, with alarm instruments $A_I$ and $A_{II}$, such as buzzers, bells or lamps, and Wheatstone bridges $M_I$ and $M_{II}$, by means of which, by a measurement of resistance, the short-circuiting switch can be determined. The electrical circuit just described is particularly suitable for relatively short distances, consisting of only a few pipe lengths. When the distances are longer, some hundreds of pipe lengths for example, a refining of the exactitude of measurement can be attained by employing special circuits, for instance with parallel resistances in each probe.

The alarm-signalling can also be effected by impulse switching, on the telephone-selector principle for instance, or by employing transistors, without any alteration of the scope of the invention.

The choice of the fluid (liquid or gaseous) located in the interspace 3 depends primarily upon the diameter of the pipe. With relatively small pipes, and with a correspondingly small elastic deformation of the lining 2, liquid media should preferably be employed, but with large pipes, and a correspondingly large displacement of material out of the interspace, gaseous media are preferable. As a liquid medium, a thinly liquid heat-resistant silicone oil is most advantageous, and as a gaseous medium, nitrogen. After the filling of the interspace 3 with the appropriate fluid at the works, the probe 8, 9 is regulated by adjusting the positioning bolt 23, the hollow screw 25, the abutment plates 11 and the hollow screw 14, with the adoption of the effectively pertinent maximum and minimum delivery pressures for the pipe in question. The probe 8, 9, when once adjusted, and tested for fluidtightness of the cover and connections, thereupon remains closed, and no longer has to be adjusted.

The laying of the pipes provided with the device according to the invention is effected in the manner that is usual in pipeline construction. The pipes can be manipulated, bent, and welded together endwise with a V-seam (FIGURE 2), or even with welding sleeves, just like ordinary pipelines. The usual insulation with bitumen and glass-fibre winding for protection against corrosion, is as far as possible effected at the works before mounting and regulating the probe 8, 9. For the protection of the electrical contacts of the switch 17 against oxidation, the control capsule 9 of the probe may be filled with nitrogen. When laying the pipes, or when bending the pipes on the site, care should however be taken that no bending of the pipe is effected at or in the immediate neighbourhood of the cross-sectional plane of the probe 8, 9. The only place not located in the control region of the lining 2 is the V-welded seam 4. Since however cracks and so forth never appear in the welded seam itself, but always close beside it in the burning zone, these are not dangerous, since they are already located in the control region of the lining 2. The same is also the case if the lining tube and the outer tube are welded to one another not endwise but around the periphery at the end of the pipe.

In the operation of a pipe line provided with the present leak-detecting and protecting device, there naturally occur fluctuations of pressure between two extreme values known in advance. Under these circumstances the lining tube 2 undergoes, according to pressure, a change of diameter between a minimum value, and a maximum value in which it is practically bearing against the internal surface of the pipe line 1. In reaching this diameter, gas or liquid is forced out of the interspace 3 and into the pressure capsule 8, the spring bellows 12 and 20 adjusting themselves according to the current pressure. If the probe is correctly regulated, the spring bellows 12, with its abutment plates 11, upon fluctuations occurring in the operating pressure, swings about the trip cams 17a and 17b of the switch 17 without actuating them. The spring bellows 20 acts herein, with the auxiliary spring 21, as compensation, so that the spring bellows 12 may not have to take up alone the entire change of volume.

In the normal case the lining tube 2 is so dimensioned that at a delivery pressure of 5 kilogrammes per square centimetre for example it already bears on the outer pipe, so that for fluctuations of pressure above 5 kilogrammes per square centimetre, no further changes of diameter can occur. Now when a leak occurs, as indicated at L in FIGURE 4, owing to a subsidence of rock for example, through a crack in the pipe 1, the medium under pressure in the interspace 3 escapes to the exterior. Owing to the normal surface roughness of the outer and the lining pipe there remains always enough space between the pipe surfaces lying close one against the other to allow any liquid or gaseous fluid to flow freely in this thin interspace. Therefore, the lining pipe cannot seal any leak in the outer pipe and prevent the medium in the interspace to escape through the leak. The pressure in the capsule 8 falls below the limit provided for, and the bellows 12 extend so far, under the action of the spring 13, that the right-hand abutment plate 11 actuates the switch 17 by means of the trip cam 17b. The circuit 1 is thereby closed, the alarm instrument $A_I$ responds, and it can immediately be ascertained, with the help of the Wheatstone bridge $M_L$, that the switch $17_{II}$ has been short-circuited on account of an inadmissible fall of pressure, that is to say, on account of a leak in the outer pipe.

1. Should a leak occur, on the contrary, in the lining pipe 2, the pressure in the interspace 3 would rise inadmissibly, owing to the escape of delivery fluid into the same under the substantially higher operating pressure, would compress the bellows 12 more than is provided for, and would actuate the switch 17 in the reverse direction through the left-hand abutment plate 11.

This last function serves in particular also for checking the device on the occasion of the high-pressure test on taking over: should the thin-walled pipe 2 have become leaky at the mounting weld 4 for instance, the testing medium (air or water) from the interior would penetrate through the leak into the interspace 3, would raise the pressure in the capsule 8, and would accordingly actuate the switch 17. If this switch reaction does not occur, the pipeline is in order, and after carrying out the normal pressure test, may be taken into operation without further testing. At the same time, during the pressure test, the pressure can be varied above and below the normal operating pressure permitting by this way to test the functioning of the device at variable pressures.

The present method, and the associated apparatus, for protecting from and detecting leakages in pipelines for liquid and gaseous substances, permits simple and uncomplicated mounting, on the usual construction-site conditions, a pressure testing of the pipeline without any substantial additional testing, and a conventional operation (usual scraping for instance) without special measures or special supervision. It occasions only an immaterial increase of cost, with the greatest possible safety. As compared with other similar devices, the leakage warning is effected not just when the fluid leaks out of the pipeline, but as soon as there is a risk of leakage, if either the lining 2 is no longer fluidtight while the pipeline 1 is intact, or the pipeline 1 becomes unsound while the lining 2 is satisfactory. Hence an immediate stoppage and repair may in most cases be avoided and postponed until a later and therefore more convenient time, in the meantime the pipeline being subject to very careful observation, and possibly other safety precautions, so long as the leakage arises merely from a small crack, or a punctiform corrosive attack on the pipe 1, because the pipe 1 is still able to bear the still fluidtight lining 2. A pipeline provided with the present leakage-protecting and detecting device is also less endangered with respect to waterhammer, because the lining pipe 2, considering its higher stress, with great probability tears first, and the pipe 1 is saved by the pressure energy thus destroyed.

I claim:

1. A length of pipe for use in constructing a pipeline comprising a length of pipe of adequate strength to support the designed pressures under which the pipeline is to operate, a thin-walled liner spaced slightly inwardly from the interior wall of the pipe and sealed to the pipe only at its extremities to provide an interspace between the interior of the length of pipe and the exterior surface of the liner, the liner being self-supporting but elastically stretchable under the designed pressures under which the pipeline is to operate to a size to contact the interior of the pipe, a fluid completely filling said interspace and a pressure responsive device operatively connected to said interspace.

2. The length of pipe as claimed in claim 1 wherein the initial difference of diameters of the outer and the lining pipe is at most 5% of the greater diameter and the wall thickness of the lining pipe is at most 1 mm.

3. The length of pipe as claimed in claim 1 wherein the thin annular interspace between lining pipe and outer pipe has a length along the pipe axis of at least the pipe length minus twice the wall thickness of the outer pipe.

4. The pipe length according to claim 1 wherein the outer pipe and the lining pipe consists of substantially the same material and the joints between their ends are made up by electrical resistance welding.

5. The pipe length according to claim 4 wherein the end joints of the outer and the lining pipe are made by flanging the lining pipe on the front side of the outer pipe and welding the flanged part to the front side.

6. The pipe length according to claim 4 wherein the end joints of the outer and the lining pipe are made by cutting both pipes to the same length and welding along their internal peripheral contact line of both front sides, said weld being narrower than the wall thickness of the outer pipe.

7. The pipe length according to claim 1 in which said pressure responsive device includes a pressure gauge with a supplemental cavity connected to the gauge and the interspace in order to correct the final volume of the interspace and thus the pressure variation between the relieved and the expanded state of the lining pipe to the desired value.

8. The pipe length according to claim 7 wherein said supplemental cavity comprises a capsule with spring-actuated bellows in order to vary the volume of the capsule.

9. The pipe length according to claim 7 wherein said supplemental cavity comprises a capsule with a spring-actuated diaphragm in order to vary the volume of the capsule.

10. The pipe length according to claim 1 wherein an alarm device is provided, said alarm device being mounted for operation by said pressure responsive device, said alarm device comprising two electrical contacts actuated by the pressure gauge, said contacts being each connected to an electrical remote signalling circuit including known measuring equipment in order to localize the contact actuated by the pressure gauge in the event the interspace pressure exceeds a lower or upper limit.

References Cited
UNITED STATES PATENTS

| | | | |
|---|---|---|---|
| 1,977,987 | 10/1934 | Corby | 73—49.1 X |
| 2,244,392 | 6/1941 | Emanueli. | |
| 3,232,640 | 1/1966 | Donkle | 73—40.7 X |

LOUIS R. PRINCE, *Primary Examiner.*

DAVID SCHONBERG, *Examiner.*

J. RENJILIAN, J. NOLTON, *Assistant Examiners.*